Sept 17, 1957 L. T. SZADY ET AL 2,806,566
ONE-WAY CLUTCH
Filed Nov. 21, 1955

INVENTORS
LEOPOLD T. SZADY
BY JOHN L. KING JR.
ATTORNEYS

United States Patent Office 2,806,566
Patented Sept. 17, 1957

2,806,566

ONE-WAY CLUTCH

Leopold T. Szady, Grosse Pointe Woods, and John L. King, Jr., Royal Oak, Mich., assignors to Formsprag Company, Van Dyke, Mich., a corporation of Michigan Application November 21, 1955, Serial No. 547,959

2 Claims. (Cl. 192—45.1)

The invention relates to one-way clutches of that type comprising spaced concentric raceways and sprags extending between said raceways and provided with energizing means for holding the same in frictional contact.

The manufacture of one-way clutches of the above type has become to a large extent a separate industry in which the clutches are made suitable for incorporation in mechanisms designed and manufactured by other concerns. However, the spaced raceways which form essential elements of the clutch may be integral portions of the mechanism in which the clutch is to be incorporated. It is essential that these raceways should be held in close concentric relation to each other as otherwise the clutch will not properly function.

It is the object of the invention to obtain a construction of clutch unit adapted as a unit to be installed in mechanism of which the spaced raceways form portions. It is a further object to obtain a construction in which the installed unit insures the holding of the raceways in concentric relation to each other. Still further it is an object to obtain a construction which incorporates a bearing for one of said raceways permitting the overrunning of the same.

With these and more specific advantageous features in view the invention consists in the construction as hereinafter set forth.

Figure 4:
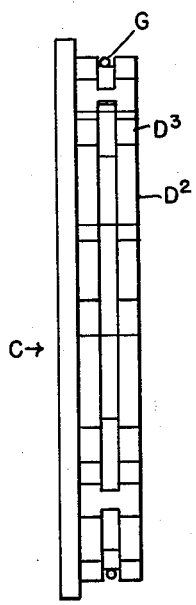
Figure 1:
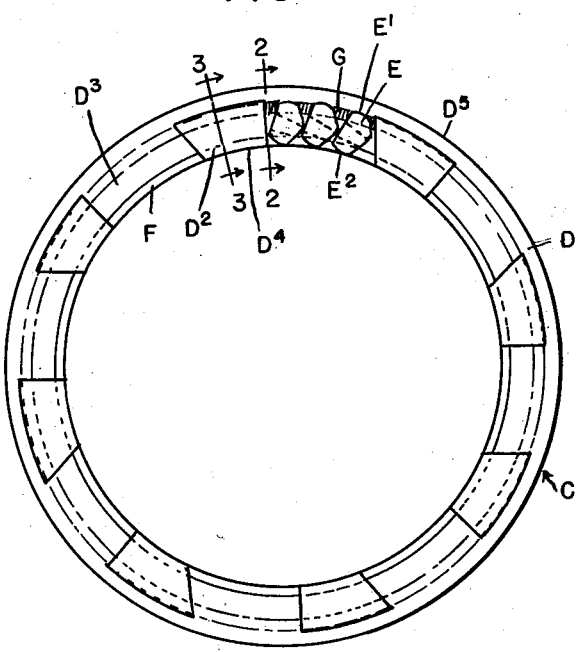
Figures 2, 3:
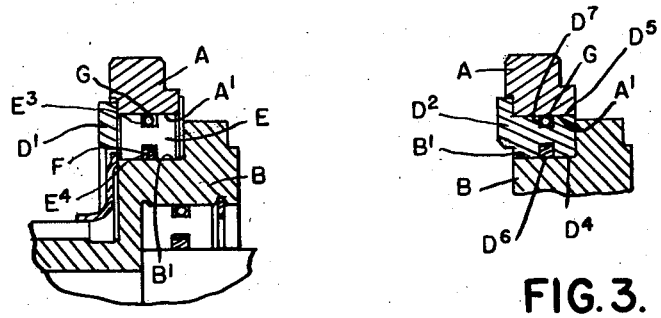

In the accompanying drawings:

Fig. 1 is a front elevation of the clutch.
Fig. 2 is a cross section on line 2—2, Fig. 1.
Fig. 3 is a cross section on line 3—3, Fig. 1.
Fig. 4 is a side elevation of the unit detached.

A and B are the spaced concentric raceways which as above stated may be portions of a separately manufactured mechanism in which a clutch unit is to be inserted. Each of these members as a whole may be of any desired construction but the member A is provided with a cylindrical face of one radius A′ and the member B with a cylindrical face of a shorter radius B′ for engaging the sprags. C is a clutch unit assembly which includes a race separator D, sprags E, a mounting ring F and an energizing garter spring G. The separator has an annular portion D′ and a series of segmental portions D² projecting laterally therefrom with spaces D³ therebetween for receiving the sprags. Each of the segmental portions D² has an inner arcuate face D⁴ for engaging the cylindrical face B′ and an outer arcuate face D⁵ for engaging the cylindrical face A′. As one of the race members is adapted to overrun with respect to the other the segmental portions D² form not only a separator but bearings for the overrunning race member. In view of this the member D is formed of material having good bearing properties such for instance as an aluminum alloy. The spaces D³ between the segments D² are of sufficient width to receive a group of sprags which as shown are three in number. The sprags E have the usual eccentric arcuate cam faces E′ and E², respectively, at their outer and inner ends and are further provided with channels E³ and E⁴ centrally of these faces. The channel E³ receives the energizing garter spring G and is fashioned so that the resilient pressure will turn the sprag into frictional engagement with the raceways. The channel E⁴ receives the ring F on which the sprags are mounted and which holds them in axial parallelism to each other. Inasmuch as both the ring F and the garter spring G are annular they must pass through the segmental portions D² of the member D. The latter are, therefore, provided with inner and outer channels D⁶ and D⁷ in alignment, respectively, with the channels E³ and E⁴. Thus, the ring F will hold the sprags against endwise movement in the spaces D³. However, there is nothing to prevent insertion of the assembly C between the members A and B to hold the latter exactly coaxial.

The unit C may be manufactured in one plant and is in condition for insertion as an assembly between the race members of a mechanism manufactured in another plant. The only requirement is that in this mechanism each of the race members must be of a predetermined radius.

What we claim as our invention is:

1. In a one-way clutch of the sprag type, a sprag assembly axially insertable as a unit between assembled concentric raceways comprising a plurality of circumferentially spaced segmental bearings for fitting between and separating said raceways and having channelled segmental faces, an annulus connecting said bearings at one end only thereof, sprags in the spaces between said bearings having channelled faces, and a ring engaging said channelled faces of said bearings and sprags forming a mounting for the latter.

2. The construction as in claim 1 having a resilient annulus for energizing the sprags, said segmental bearing portions having channels in their inner and outer arcuate faces, one for receiving said ring and the other said energizing annulus, said sprags having channels in their raceway engaging portions for receiving respectively said ring and resilient annulus and registering with the channels in said segmental bearings.

References Cited in the file of this patent

UNITED STATES PATENTS

| 2,366,842 | Dodge et al. | Jan. 9, 1945 |
| 2,705,066 | Szady | Mar. 29, 1955 |
| 2,748,912 | Banker | June 5, 1956 |